No. 675,508. Patented June 4, 1901.
G. DEAN.
FLOATING FISH TRAP.
(Application filed Mar. 1, 1901.)
(No Model.) 2 Sheets—Sheet 2.
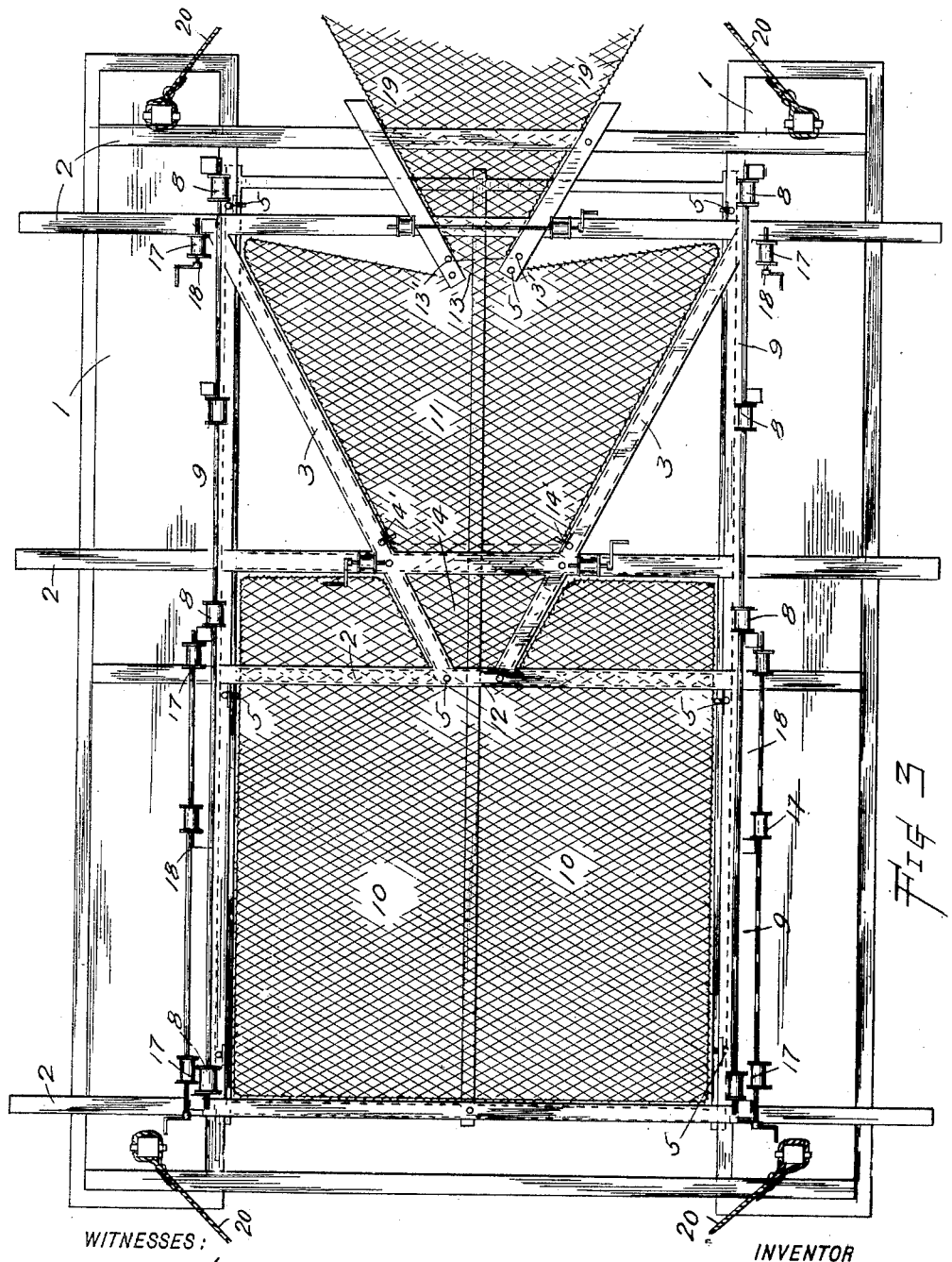
WITNESSES:
D. O. Seaman
F. D. Moss.
INVENTOR
George Dean,
BY
Pierre Barnes.
ATTORNEY

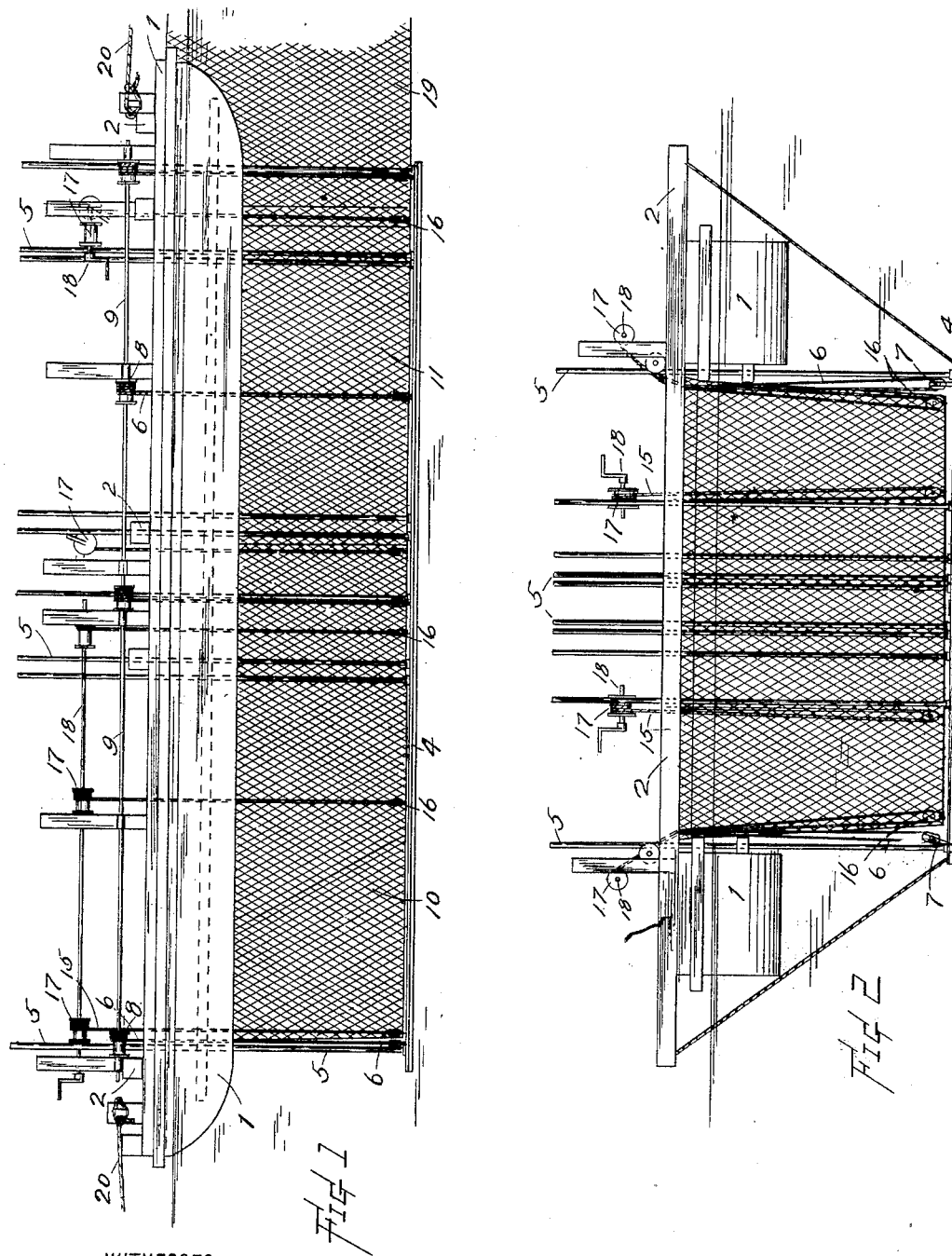

UNITED STATES PATENT OFFICE.

GEORGE DEAN, OF SAMISH, WASHINGTON.

FLOATING FISH-TRAP.

SPECIFICATION forming part of Letters Patent No. 675,508, dated June 4, 1901.

Application filed March 1, 1901. Serial No. 49,501. (No model.)

*To all whom it may concern:*

Be it known that I, GEORGE DEAN, a citizen of the United States, residing at Samish, in the county of Skagit and State of Washington, have invented certain new and useful Improvements in Floating Fish-Traps, of which the following is a specification, reference being had therein to the accompanying drawings.

My invention relates to fish-traps; and the object of the invention is to provide certain new and useful improvements in floating traps whereby fish may be trapped in situations prohibiting the used of fixed traps.

The invention consists principally of two floats which support the netting-frame depending therefrom.

The invention further consists of certain parts and details and combinations of the same, as will be fully described hereinafter and pointed out in the claims.

Reference is to be had to the accompanying drawings, forming part of this specification, in which similar characters of reference indicate corresponding parts in all of the figures.

Figure 1 is a vertical side elevation of my improved trap. Figs. 2 and 3 are respectively end and plan views of the same.

The floats 1 of any approved construction are connected together by cross-beams 2 and suitable braces, such as 3, so that a very substantial framework for rigidly securing the floats and a proper support of the depending skeleton frame of the trap is secured. The said skeleton frame comprises a horizontal bottom or floor portion 4, together with a number of vertical rods 5, firmly connected thereto, but slidably connected to the floats and framework 2 3 to permit the skeleton frame being immersed in the water to varying depths. The depending frame is raised or lowered by lines 6, passing through pulleys 7 and operated by drums or spools 8, mounted upon shafts 9, journaled in suitable supports upon the deck of the vessel or upon the upper framework.

The floor, sides, walls, and ends, excepting openings left for communication between the compartments are covered with netting, so as to form a "pot" 10 and a "heart" 11. The pot being closed except upon the end adjacent to the heart, where the walls terminate in an entrance 12, projecting into the interior of the pot. The heart has at one end an entrance 13, projecting interiorly therein, and at the opposite end or adjacent to the pot an exit 14, which registers with the aforesaid pot-entrance 12. The openings 13 14 of the heart are provided with gates of netting slidable upon rods 13' 14', which are intended to prevent the escape of the fish entrained within the heart when the pot is raised for the removal of the fish entrapped therein. Lines 15, with lead-pulleys 16 and drums 17, mounted upon shafts 18, are used for handling the said netting that is connected by being seized along its top edges to the floats and upper framework, the depending skeleton frame being used to confine the netting to the desired shape or form.

19 represents lead-walls that may be extended in diverging lines from the entrance of the heart to any distances and may be supported by independent floats or fixed piles.

The trap is connected by bridle-lines 20 to anchors for securing the same in a suitable location in the fishing-ground.

Having thus described my invention, what I claim as new, and desire to secure by Letters Patent, is—

1. A floating fish-trap in combination with a lead or leads, of floats rigidly secured together, a skeleton frame depending therefrom and adapted to be immersed to varying depths, and netting dividing the trap into compartments with communicative connection therebetween and between one of said compartments and the said lead or leads, substantially as set forth.

2. A floating fish-trap in combination with a lead or leads, of floats rigidly secured together, a skeleton frame depending therefrom and adapted to be immersed to varying depths, netting dividing the trap into compartments with communicative connection therebetween and between one of said compartments and the said lead or leads, and movable gates to the said communicative connections, substantially as set forth.

3. In a floating fish-trap, the combination with floats, a frame rigidly connecting said floats, a lead, and a skeleton frame depending from said floats, of a netting attached at its upper edge to the said floats and adapted to be raised or lowered independently of the said skeleton frame, substantially as and for the purposes set forth.

4. In a floating fish-trap, comprising a heart and a pot, in combination with floats, of a skeleton frame and a netting, and means to raise and lower the same relatively to the floats and independently of each other, substantially as and for the purposes set forth.

In testimony whereof I affix my signature in presence of two witnesses.

GEORGE DEAN.

Witnesses:
  PIERRE BARNES,
  WM. MARTIN.